United States Patent
Boushehri et al.

(10) Patent No.: US 9,240,116 B1
(45) Date of Patent: Jan. 19, 2016

(54) INTEGRATED GAS DETECTION AND VEHICLE TELEMATICS SYSTEM

(71) Applicant: Sprint Communications Company L.P., Overland Park, KS (US)

(72) Inventors: Amer Boushehri, Houston, TX (US); David Robert Turissini, Leawood, KS (US)

(73) Assignee: Sprint Communications Company L.P., Overland Park, KS (US)

(*) Notice: Subject to any disclaimer, the term of this patent is extended or adjusted under 35 U.S.C. 154(b) by 107 days.

(21) Appl. No.: 14/061,171

(22) Filed: Oct. 23, 2013

(51) Int. Cl.
- *B60Q 1/00* (2006.01)
- *G08B 21/12* (2006.01)
- *B60Q 9/00* (2006.01)

(52) U.S. Cl.
CPC . *G08B 21/12* (2013.01); *B60Q 9/00* (2013.01)

(58) Field of Classification Search
CPC ........ G08B 21/12; G08B 21/06; G07C 5/008; G07C 5/0858; B60Q 9/00; B60R 16/0236
USPC ......... 340/438, 439, 425.5, 905, 870.07, 632; 180/272, 273; 701/1, 300, 45
See application file for complete search history.

(56) References Cited

U.S. PATENT DOCUMENTS

| | | | | |
|---|---|---|---|---|
| 6,549,145 | B2 * | 4/2003 | Hsu et al. | 340/905 |
| 6,639,512 | B1 * | 10/2003 | Lee et al. | 340/438 |
| 7,596,439 | B2 * | 9/2009 | Oesterling et al. | 701/38 |
| 8,190,331 | B2 * | 5/2012 | Browne et al. | 701/45 |
| 2008/0284575 | A1 * | 11/2008 | Breed | 340/438 |
| 2012/0001743 | A1 * | 1/2012 | Cotten et al. | 340/438 |

* cited by examiner

Primary Examiner — Anh V La

(57) ABSTRACT

Systems and methods for detecting chemical substance levels in surrounding environments using an integrated vehicle system are provided. A vehicle is equipped with a vehicle system comprising a detector component, a vehicle telematics component, and mobile gateway component. The detector component monitors a level of one or more chemical substances and determines that a threshold level of the one or more chemical substances has been detected. The vehicle telematics component generates an alert signaling detection of the threshold level of the one or more chemical substances. The alert may be communicated to one or more recipients including a command center. The alert may include, among other things, the level of the one or more chemical substances and the location of the vehicle. Communication of the alert and additional communications with the one or more recipients is facilitated by a mobile gateway component that provides access to a wireless communications network.

20 Claims, 4 Drawing Sheets

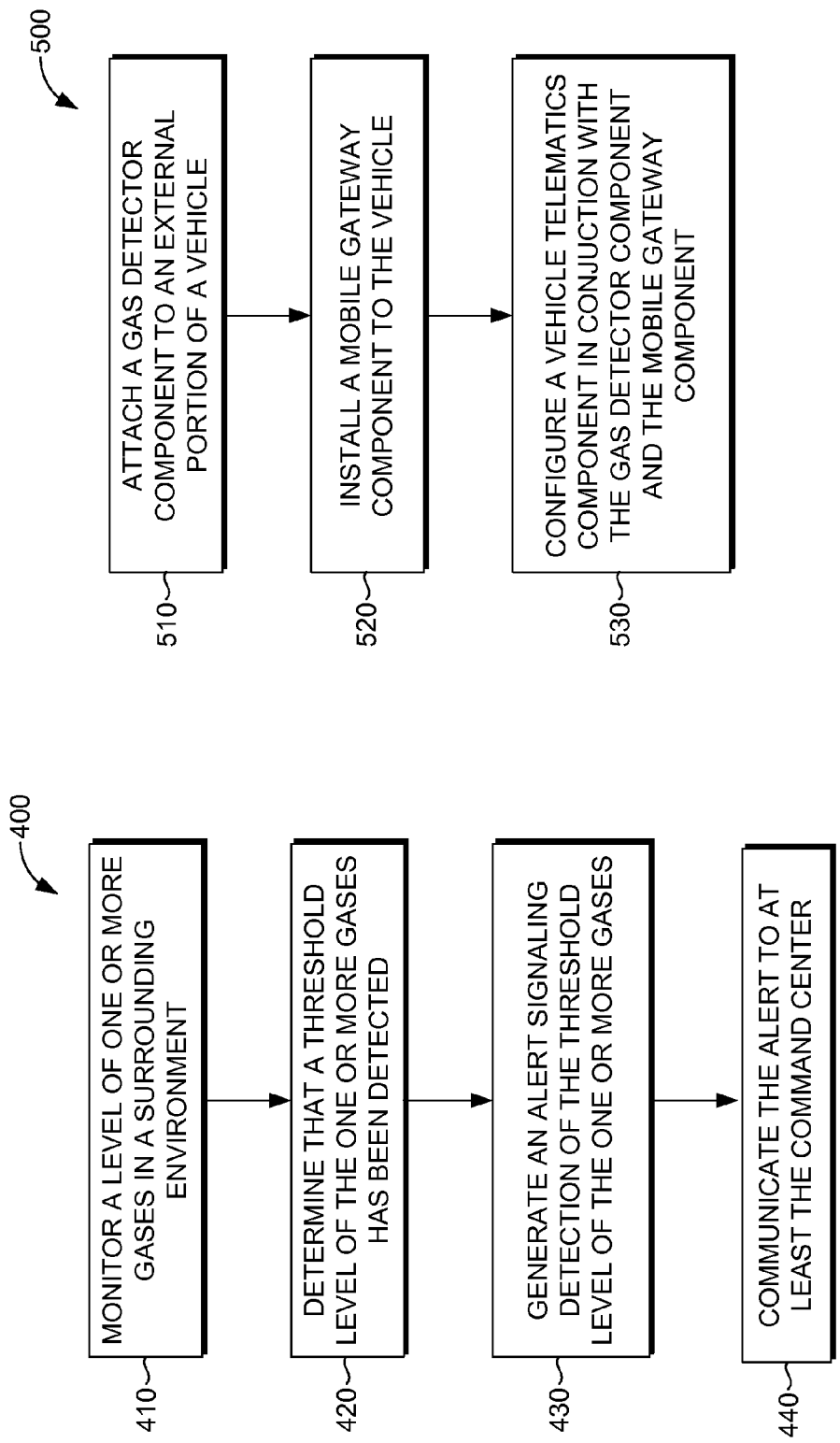

INTEGRATED GAS DETECTION AND VEHICLE TELEMATICS SYSTEM

SUMMARY OF THE INVENTION

A high-level overview of the invention is provided here to disclose and to introduce a selection of concepts that are further described below in the detailed description section. This summary is not intended to identify key features or essential features of the claimed subject matter, nor is it intended to be used as an aid in isolation to determine the scope of the claimed subject matter.

In brief and at a high level, this disclosure describes, among other things, systems and methods for detecting chemical substance levels in surrounding environments using an integrated chemical substance detection and vehicle telematics system ("vehicle system") of a vehicle. A vehicle can be equipped with a vehicle system comprising a detector component, a vehicle telematics component, and mobile gateway component. The detector component monitors levels of one or more chemical substances and determines that a threshold level of the one or more chemical substances has been detected. The vehicle telematics component generates an alert signaling detection of the threshold level of the one or more chemical substances. The alert may be communicated to one or more recipients including a command center. The alert may include, among other things, the level of the one or more chemical substances and the location of the vehicle. Communication of the alert and additional communications with the one or more recipients is facilitated by a mobile gateway component that provides access to a wireless communications network.

Additional objects, advantages, and novel features of the invention are set forth in the description which follows and will become apparent to those ordinarily skilled in the art upon examination of the following, or may be learned by practice of the invention.

BRIEF DESCRIPTION OF THE SEVERAL VIEWS OF THE DRAWINGS

Illustrative embodiments of the present invention are described in detail below with reference to the attached drawing figures, which are incorporated herein by reference, wherein:

FIG. 4 depicts a flowchart illustrating a method for detecting one or more chemical substances in a surrounding environment, in accordance with an embodiment of the present invention; and FIG. 5 depicts a flowchart illustrating a method for retrofitting vehicles with vehicle systems, in accordance with an embodiment of the present invention.

DETAILED DESCRIPTION OF THE INVENTION

Figure 1:
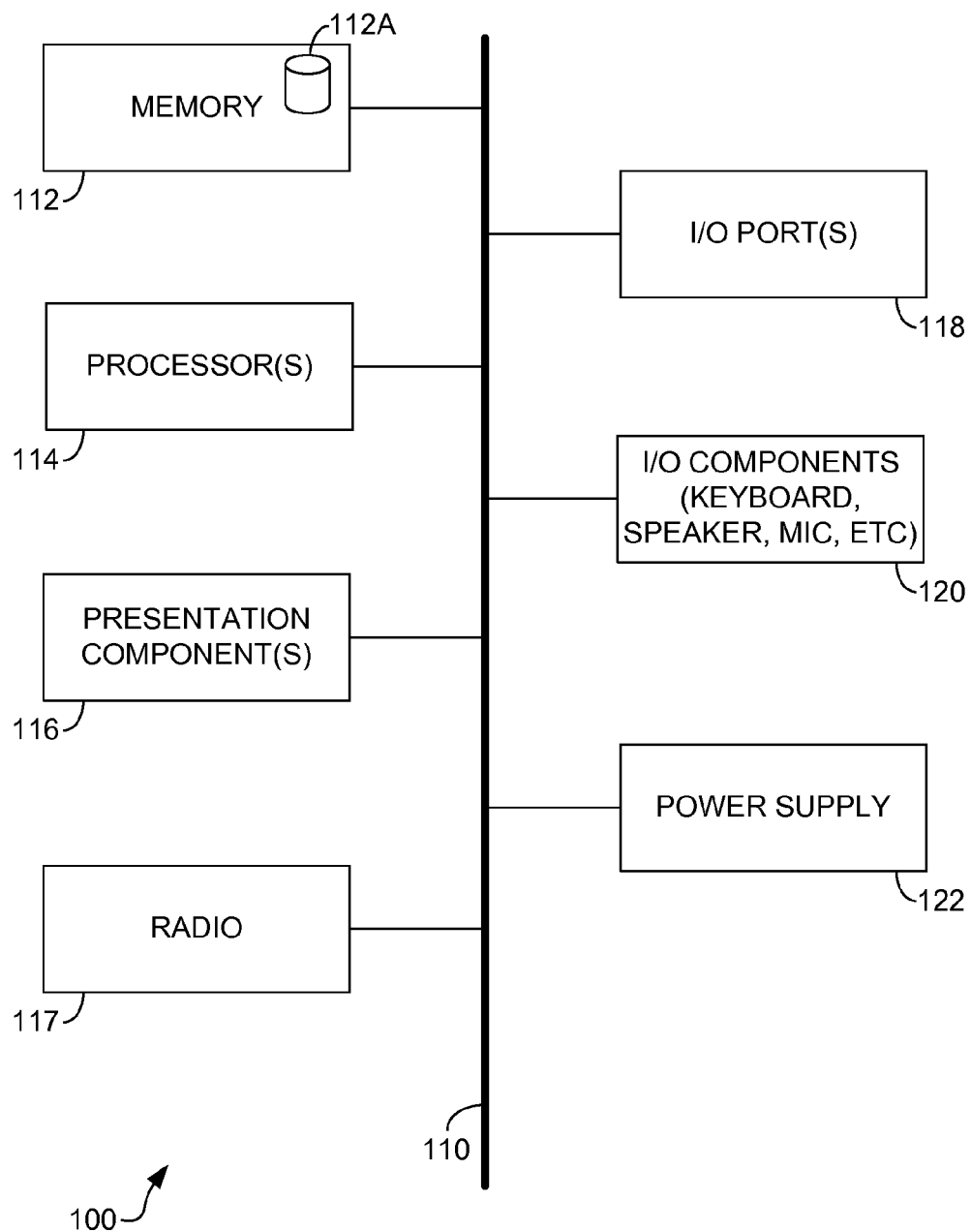
FIG. 1 depicts a block diagram of a mobile device in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, "a feature" is satisfied where one or more features are present. Also, the term "or" includes the conjunctive, the disjunctive and both (a or b thus includes either a or b, as well as a and b).

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention.

| CDMA | Code Division Multiple Access |
|------|-------------------------------|
| GPS  | Global Positioning System     |
| GSM  | Global System for Mobile communications (Groupe Spècial Mobile) |
| LTE  | Long Term Evolution           |
| TDMA | Time Division Multiple Access |
| UMTS | Universal Mobile Telecommunications System |

For purposes of a detailed discussion below, a vehicle system is described. Further, while embodiments of the present invention may generally refer to the components described, it is understood that an implementation of the techniques described may be extended to cases with different components carrying out the steps described herein. It is contemplated that embodiments of the present invention may utilize different types of individual components of the vehicle system, such as, different detector components, vehicle telematics components, and mobile gateway components.

Embodiments of our technology may be embodied as, among other things, a method, system, or set of instructions embodied on one or more computer-readable media. Computer-readable media include both volatile and nonvolatile media, removable and non-removable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

A chemical substance is a form of matter that has characteristic properties. It can be solid, liquid, gas or plasma. A chemical compound is a pure chemical substance consisting of two or more different elements. For purposes of a detailed discussion, embodiments of the present invention are described, in exemplary embodiments, using a gas detector having sensors, and Hydrogen Sulfide (hereinafter "$H_2S$") as a gas chemical substance. It is contemplated that other types of chemical substances having different states and sensors for detecting variations and combinations thereof may detected with embodiments of the present invention.

H$_2$S occurs in natural gas and some well waters. Due to the toxic and corrosive nature of some chemical compounds, such as, H$_2$S, sensors have been developed to help detect the presence of chemical compounds in the environment. For example, a gas sensor detects the presence of various gases within an area. Gas detectors can be classified according to the operation mechanism (semiconductors, oxidation, catalytic, infrared, etc.). Gas detectors generally come in two main types: portable devices and fixed gas detectors. The first is used to monitor the atmosphere around personnel and is worn on clothing or on a belt/harness. The second type of gas detectors are fixed type which may be used for detection of one or more gas types. Fixed type detectors are generally mounted near the process area of a wellhead or plant. Generally, they are installed on fixed type steel structures for continuous monitoring and a tripping interlock can be activated for an emergency situation. A gas sensor can sound an alarm to operators in the area where a leak is occurring, giving them the opportunity to leave.

Conventional portable devices and fixed gas detectors are limited in their capacity to provide increased levels of protection in certain situations. For example, personnel wearing portable sensor devices may already become exposed to harmful gases before and/or during detection of the harmful gases by the portable devices. Portable devices further are not as robust as some fixed gas detectors in providing detection and communication functions. With regard to fixed gas detectors, they can only be used to detect gases in a limited geographic area and cannot be moved easily from site to site. As such, there is a substantial need to improve the safety of portable devices, improve the mobility of more proficient fixed gas detector systems, and provide additional functionality in communicating the presence of toxic levels of chemical substances.

Embodiments of the present invention provide systems and methods for detecting chemical substance levels in surrounding environments using a vehicle system. In particular, a vehicle allows mobility and transportation, a detector component measures and indicates the concentration of certain chemical substances such that the vehicle system communicates with a command center. Telematics provides a platform for integrating the detection of chemical substance levels within a vehicle. Telematics generally refers to use of telecommunications and informatics, for example, a mechanical or electronic device communicates with other devices or human users over a network. Telecommunications equipment and computing devices can be used to store, retrieve, transmit and manipulate data. In particular, telematics may be applied in vehicles and with control of vehicles on the move. For example, vehicle telematics may include electronic control units that monitor wheel slip, engine temperature, fuel mixture and other variables. In this regard, a vehicle telematics component integrated with a detecting component can provide for detecting chemical substance levels in surrounding environments.

Accordingly, in a first aspect of the present invention, a vehicle system for detecting chemical substances in a surrounding environment is provided. The system includes a detector component configured for monitoring levels of one more chemical substances. The detector component is also configured for determining that a threshold level of the one or more chemical substances been detected. The detector component is further configured for communicating the levels of the one or more chemical substances. The system further includes a vehicle telematics component configured for generating an alert signaling detection of the threshold level of the one or more chemical substances. The vehicle telematics component is also configured for communicating the alert to one or more recipients. The system also includes a mobile gateway component configured for providing access to a wireless communications network for communicating the alert.

In a second aspect of the present invention, a method for detecting gas in surrounding environments using an integrated gas detection and vehicle telematics system of a vehicle is provided. The method includes monitoring, using a gas detector, a level of one or more gases in a surrounding environment. The method also includes determining that a threshold level of the one or more gases has been detected. The method further includes generating an alert signaling detection of the threshold level of the one or more gases. The method includes communicating the alert to at least a command center.

In a third aspect of the present invention, a method for retrofitting vehicles with integrated gas detection and vehicle telematics systems is provided. The method includes attaching a gas detector component having one or more sensors to one or more external portions of a vehicle. The method also includes installing a mobile gateway component to the vehicle. The mobile gateway provides communications with a wireless communications network. The method further includes configuring a vehicle telematics component with one or more telematics features in conjunction with the gas detector component and mobile gateway component.

Turning now to FIG. 1, a block diagram of an illustrative mobile device is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display and a speaker, as well as other components that can present information (such as a lamp (LED), or even lighted keyboards).

Radio 117 represents a radio that facilitates communication with a wireless telecommunications network. Illustrative wireless telecommunications technologies include Long Term Evolution (LTE) and Evolved Data Optimized (EVDO) and the like. In some embodiments, radio 117 might also facilitate other types of wireless communications including Wi-Fi communications.

Input/output port 118 might take on a variety of forms. Illustrative input/output ports include a USB jack, stereo jack, infrared port, proprietary communications ports, and the like. Input/output components 120 include items such as keyboards, microphones, touchscreens, and any other item usable to directly or indirectly input data into mobile device 100. Power supply 122 includes items such as batteries, fuel cells, or any other component that can act as a power source to power mobile device 100.

Figure 2:
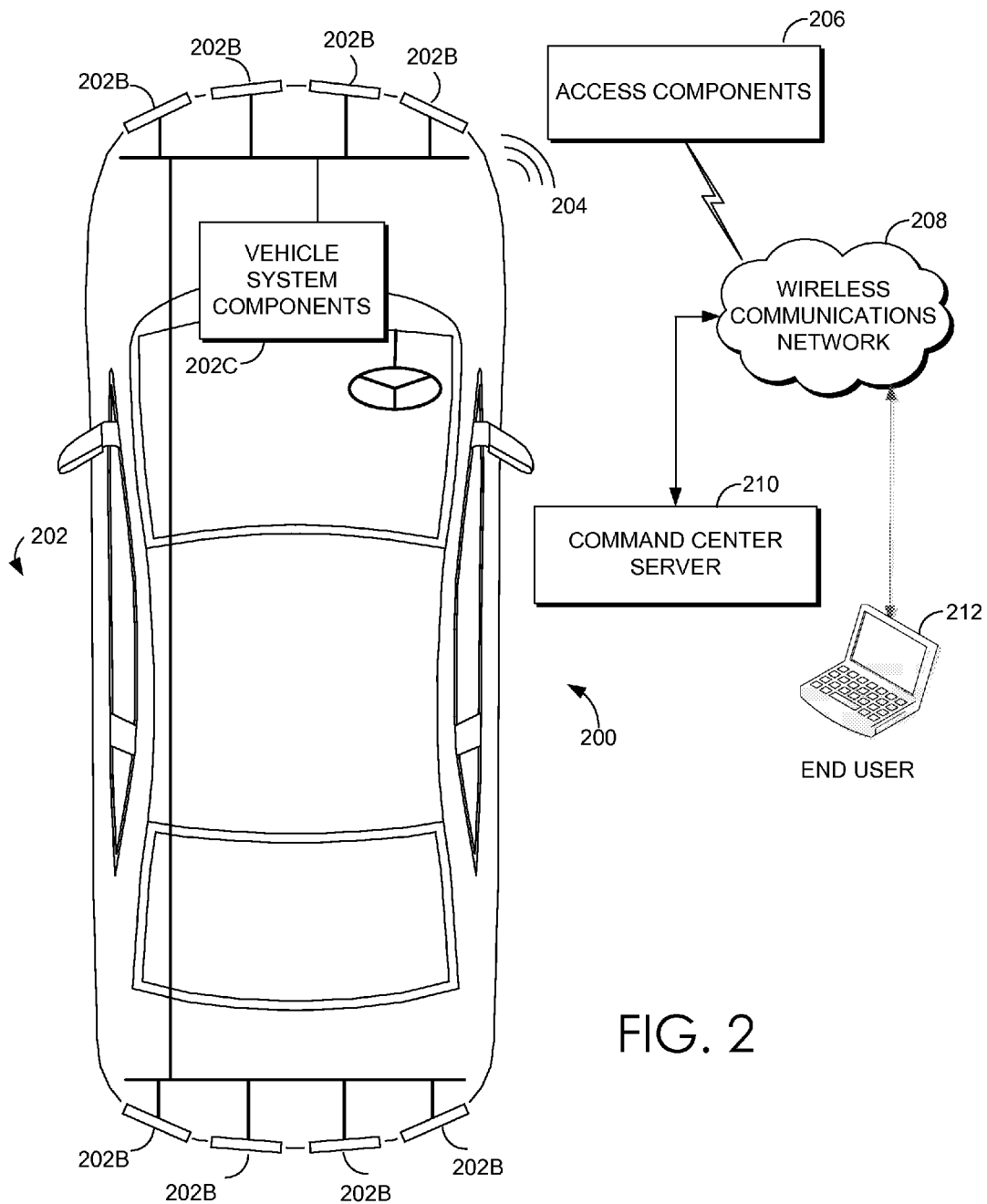
FIG. 2 depicts an illustrative operating environment for carrying out embodiments of the present invention.

FIG. 2 depicts an illustrative operating environment, referenced generally by the numeral 200, which enables a method for detecting levels of chemical substances. The operating environment 200 includes a vehicle system 202 having detector components 202B and a plurality of system components 202C, access components 206, a wireless communications network 208, a command center server 210, and one or more end users 212. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Vehicle system 202, in one embodiment, is the type of mobile device described in connection with FIG. 1 herein. Vehicle system 202 may communicate with a wireless communication network or other components not internal to the vehicle system 202. Vehicle system 202 may support a wide variety of other services (e.g., text messaging, MMS, e-mail, internet access, short-range wireless communication, reporting, and applications). In particular, vehicle system 202 may include a detector component (e.g., 202B) for detecting levels of the concentration of one or more gases such that an alert having at least the levels of the one or more gases and the location of the vehicle is communicated using a vehicle telematics component (e.g., 202C) through a wireless communications network using a mobile gateway component (e.g., 202C). Communications to and from the vehicle system 202 may be received at access components 206 and routed via the wireless communication network 208.

Vehicle system 202 communicates with access components 206 by way of a communications link 204. Communications link 204 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., mobile hotspot) that provides access to a wireless communications network, such as a WLAN connection using 802.11 protocol. A long-range connection may include a connection using one or more of CDMA, GSM, TDMA, LTE, and 802.16.

Vehicle system 202 may include a client service component (e.g., 202C) that facilitates carrying out aspects of the technology described herein. The client service may be a resident application on the vehicle system 202, a portion of the firmware, a stand-alone website, or a combined application/web offering that is used to facilitate generating and transmitting information relevant to detecting levels of chemical substances in a surrounding environment. Whenever we speak of an application, software, or the like, we are really referring to one or more computer-readable media that are embodied with a set of computer-executable instructions that facilitate various actions to be performed. For readability purposes, we will not always include this lengthy terminology.

Generally, the access components 206 provide access to what some skilled artisans refer to as a wireless communications network 208, also termed a core network. A wireless communications network 208 may comprise one or more of the components illustrated in FIG. 2. Not all components that make up a wireless communications network are shown. Also, not all connections or possible connections are shown. The access components 206 may be one or more of a base transceiver station (BTS), a Wi-Fi router, a mobile hotspot, a switch and any other device that facilitates communication between vehicle system 202 and wireless communications network 208. In one embodiment, the access components 206 include both a Wi-Fi router and a BTS tower. In another embodiment, access components 206 may be BTS towers. A radio network controller (RNC) (not shown) performs various functions, such as managing radio channels, power control, load control, admission control, packet scheduling, handover control, macrodiversity, security functions, and mobility management. A base station controller (BSC) (not shown) acts as the intelligence behind base transceiver stations (BTS) (not shown), and handles allocation of radio channels, receives measurements from mobile devices, and controls handovers from one BTS to another BTS.

Figure 3:
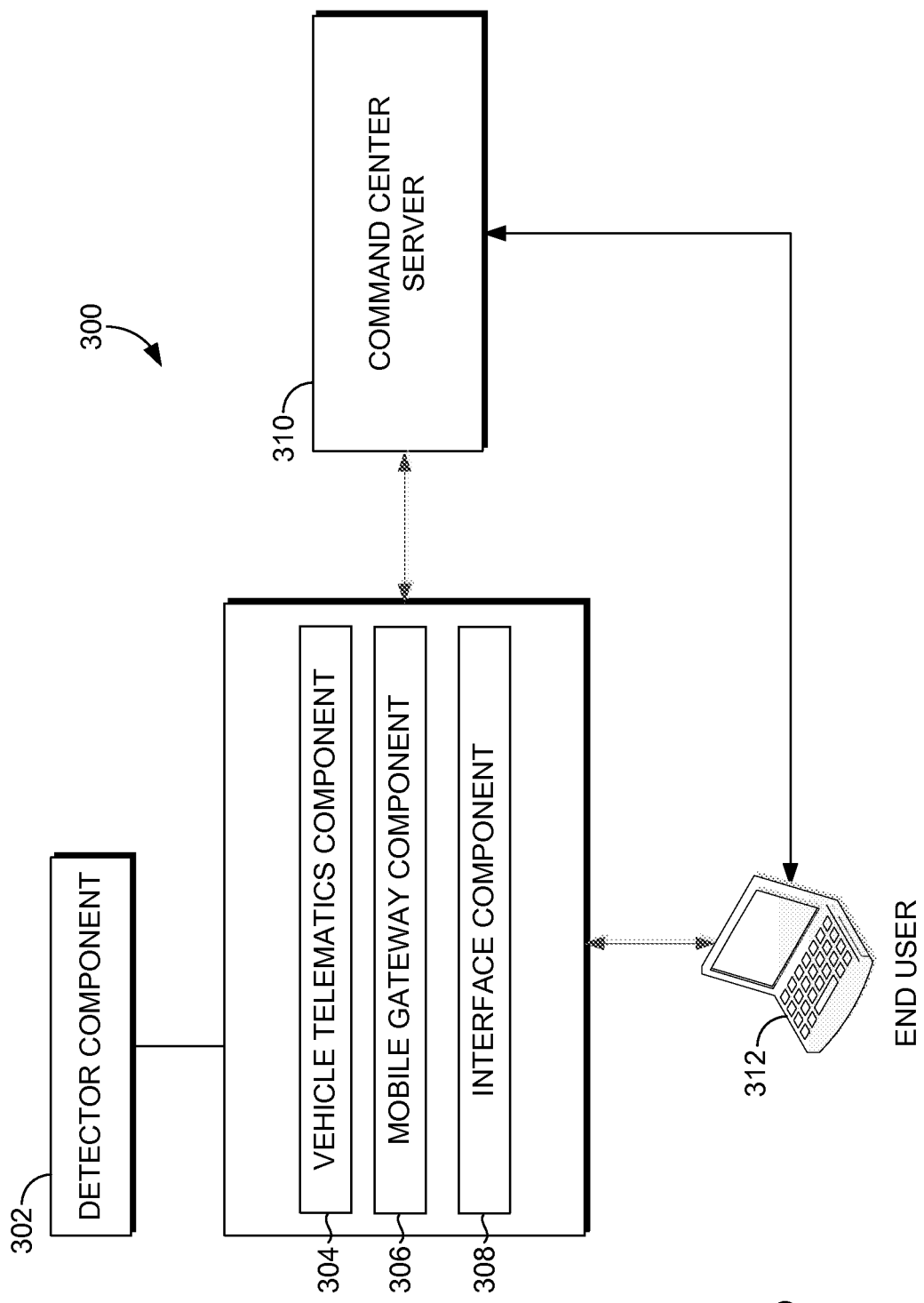
FIG. 3 depicts an illustrative operating environment for carrying out embodiments of the present invention.

With continued reference to FIG. 3, an illustrative operating environment, referenced generally by the numeral 300, which enables a method for detecting levels of chemical substances. The operating environment 300 includes a vehicle system comprising a detector component 302, a vehicle telematics component 304, a mobile gateway component 306, and an interface component 308, a command center server 310, and an end user 312.

The detector component 302 is generally responsible for monitoring levels of a chemical substance in a surrounding environment. The detector component 302 can be built-in on the vehicle having the system or mountable on a plurality of portions of the vehicle. For example, a gas detector can be mounted on an external front portion of the vehicle. The detector component 302 may be, for example, a gas detector, that measures and indicates the levels and/or concentration of certain gases in the air. The detector component 302 may be physically coupled to one or more additional components of the vehicle system for sending or receiving communications. It is contemplated that the detector component 302 may in the alternative communicate wireless with other components of the vehicle system. For example, the detector component 302 can communicate wirelessly with the vehicle telematics component. The detector component 302 may further include one or more sensors for facilitating the measuring of the levels of gases. Different types of sensors (electrochemical sensors, metal oxide semiconductor) can be used with embodiments of the present invention. The detector component 302 can also be configured to detect several different types of gases. The detector component 302 can measure a specified gas (e.g., $H_2S$) concentration.

In one exemplary embodiment, a sensor response serves as the reference point or scale for the level of a gas. When the sensor response surpasses a certain predefined threshold, the detector component 302 may communicate the level of the gas surpassing the threshold. The detector component 302 may itself also include indications of the measured gas and indications of the surpassed threshold. The detector component 302 may further include the capacity for built-in diagnostics, such that, additional diagnostic information is provided from the detector component 302 to other components of the vehicle system. In embodiments, the detector component 302 monitors a level of a gas and communicates the level, such that, a separate component determines whether a threshold level of the gas has been detected and/or performs additional diagnostics on the received monitored level of the gas. It is contemplated that the detector component 302 can also measure the levels of gases in the surrounding environment in real-time, periodically, and on-demand. Any variations and combination for determining and indicating a threshold level of a gas, using the detector component 302, are contemplated with embodiments of the present invention.

The vehicle telematics component 304 is generally responsible for communications and assessment of monitored levels of chemical substances. The vehicle telematics component 304 can be built-in on the vehicle or retrofitted into the vehicle. The vehicle telematics component 304 may be physically coupled to the vehicle. In this regard, the vehicle telematics component 304 may communicate with one or more components of the vehicle via a physically coupled interface. It is also contemplated that in addition or in the alternative of a physical coupled connection, the vehicle telematics component can communicate wirelessly with one or more components of the vehicle. For example, the vehicle telematics component 304 may be an on-board diagnostics (ODB) connection. The ODB specification provides for standardized hardware in diagnostics and reporting capabilities. In embodiments, the ODB connection communicates wirelessly with the detector component 302. Wireless communication can be facilitated by a listener on the ODB connection. The listener may receive wireless communications from the detector component and communicate the communications to external components (e.g., vehicle system components) and internal components (e.g., chipset) of the ODB connection. The vehicle telematics component can include one or more chipsets for supporting its own functions or functions of one or more vehicle system components. The vehicle telematics component may further support remote access and configuration of features and functionality of the vehicle telematics component. Remote access may support configuration of the features described herein directed to detecting levels of gases and also additional vehicle telematics features including productivity tracking, driver safety, and vehicle diagnostics.

In one embodiment, the vehicle telematics component 302 receives an indication that a threshold level of gas has been detected. It is contemplated that the vehicle telematics component 304 can receive a level of a gas and make a determination whether a threshold level of the gas has been detected and/or perform additional diagnostics based on the threshold level of the gas. The indication that a threshold level of a gas has been detected triggers the vehicle telematics component 302 to generate an alert. The vehicle telematics component 304 in generating the alert may determine the location of the vehicle using a global positioning system. The alert can include, among other things, the level of the gas, the location, the driver, the make/model of the vehicle, the time of the alert and additional diagnostic information of the incident. The alert may be composed as a digital message that is then communicated to one or more recipients, including a command center (e.g., command center server 310). The one or more recipients may receive e-mails and/or text messages to mobile devices. The vehicle telematics component 304 may further communicate alerts using one or more interfaces (e.g., interface component 308). An interface may generally refer to a point of interaction with software or computer hardware, or with peripheral devices such as a computer monitor or keyboard. User interfaces, in particular, include spaces where interaction between humans and machines occurs. User interfaces provide for operation and control of the vehicle system and functions of the present invention, and feedback from the vehicle system which aids the end user in making operational decisions. For example, an audible alarm comprising a visual indication (e.g., red light) may be triggered in an internal portion of the vehicle when a threshold level of a gas has been detected. An external alarm and visual indication may also be available. Moreover, an end user (e.g., end user 312) may access, via a web console, the vehicle telematics component 304 for receiving alerts and/or reporting on one or more of the features of the vehicle telematics component 304.

With continued reference to FIG. 3, the vehicle system further includes a mobile gateway component 306. The mobile gateway component 306 may be integrated with the vehicle telematics component 304 and/or facilitated in its functionality based on a hardware/software of the vehicle telematics component 304. A specialized chipset may be used in functions involving the mobile gateway component 306 and the vehicle telematics component 304. The mobile gateway component 306 is generally responsible for communications between the vehicle system and the wireless communications network. In this regard, the mobile gateway component 306 also supports remote management and control of features in the vehicle system, for example, alert reporting, location tracking, vehicle diagnostics, etc. The mobile gateway component 306 may support applications and interfaces that need network connectivity such that one or more end users (e.g., end user 312) may gain access to the vehicle system. For example, the mobile gateway component 306 can provide access for communicating alerts (e.g., digital messages) to a command center (e.g., command center server 312). In embodiments, the mobile gateway component 306 may function with a signal booster antenna (not shown) that reduces dropped connections and dead zones in order to provide strong, reliable signals. The signal booster antenna may further support both voice and data communications.

A command center generally refers to any place that is used to provide centralized command. In this case, the command center is used for communications between components and end users who monitor the levels of chemical substances in different environments in order to respond to alerts, develop an action plan, and communicate with one or more additional recipients. The command center may also be used for coordinating field service (people, equipment, parts, and tools). The functions of the command center are supported by command center server 310. The command center server 310 is a system comprising software and/or computer hardware that respond to requests across the wireless communications network to provide or help provide a network service. Network services may include features described herein for the vehicle system (e.g., vehicle telematics features, GPS mapping features, fleet management features, mobile networking features). The command center server 310 may be configured to receive the one or more alerts from the vehicle system. The command center server may further communicate with one or more additional users the alert, and also communicate an action plan for responding to the alert. The command center server may also be used to generate reports on alert incidents and also on other network services. In embodiments, a plurality of end users (e.g., end user 312) can access and configure network services via the command center server 310.

Referring to FIG. 4, a flowchart illustrates method 400 for detecting gas levels in surrounding environments using an integrated gas detection and vehicle telematics system of a vehicle. Initially, at step 410, a gas detector is used to monitor a level of one or more gases in a surrounding environment. The gas detector that includes one or more sensors may be mounted on one or more external portions of the vehicle. At step 420, a determination that a threshold level of the one or more gases has been detected, is made. In embodiments, a detector component and/or vehicle telematics component can be configured to make the determination of the threshold level being surpassed. At step 430, an alert signaling detection of the threshold level of the one or more gases is generated. Generating the alert may further include generating an audible alarm comprising a visual indication in at least an internal portion of the vehicle. Generating the alert may also include determining a location of the vehicle using global position system, composing the alert, where the alert includes at least the level of the one or more gases and the location, and providing the alert for communication. At step 440, the alert is communicated at least to a command center. The command center may further communicate the one or more alerts to one or more recipients or run reports on one or more incidents. Communicating the alert is facilitated by a mobile gateway associated with a wireless communications network. The wireless communications network also provides remote access to the integrated gas detector and vehicle telematics system to a plurality of end users using one or more user interfaces.

Referring to FIG. 5, a flowchart illustrates a method 400 for retrofitting vehicles with integrated gas detection and vehicle telematics systems. Initially, at step 510, a gas detector component having one or more sensors is attached on one or more external portions of a vehicle. The one or more external portions include at least a front portion of the vehicle. At step 520, a mobile gateway component is installed. The mobile gateway provides communications with a wireless communications network. In embodiments, the mobile gateway supports a global position positioning system. Further, a wireless signal booster coupled to an antenna may be installed. The wireless signal booster supports both voice and data communications. At step 530, a vehicle telematics component is configured with one or more vehicle telematics features in conjunction with the gas detector component and mobile gateway component. The vehicle telematics component is configured for facilitating the communication of one or more alerts upon the gas detector component measuring a threshold level of one or more gases.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A vehicle system for detecting chemical substances in a surrounding environment, the system comprising:
   a detector component configured for:
      monitoring a level of one or more chemical substances; and
      communicating the level of the one or more chemical substances;
   a vehicle telematics component configured for:
      receiving the level of the one or more chemical substances;
      determining that a threshold level of the one or more chemical substances has been detected;
      generating an alert signaling detection of the threshold level of the one or more chemical substances, wherein the alert is generated based on the determination that the threshold level of the one or more chemical substances has been detected; and
      communicating the alert;
   a mobile gateway component configured for:
      receiving the alert;
      upon receiving the alert, providing access to an access component in a wireless communications network for communicating the alert; and
      communicating the alert to one or more recipients.

2. The vehicle system of claim 1, wherein the detector system is a gas detector having one or more sensors.

3. The vehicle system of claim 2, wherein the gas detector is mounted on an external front portion of a vehicle having the vehicle system.

4. The vehicle system of claim 1, wherein the vehicle telematics component is retrofitted into a vehicle.

5. The vehicle system of claim 1, wherein the vehicle telematics component is further configured for:
   determining a location of a vehicle using a global position system;
   composing the alert, wherein the alert includes at least the level of the one or more chemical substances and the location; and
   communicating the alert using one of more interfaces, wherein at least one of the one or more interface provides an audible alarm comprising a visual indication in at least an internal portion of the vehicle.

6. The vehicle system of claim 1, wherein the mobile gateway component operates using a specialized chipset coupled to the vehicle telematics component, the mobile gateway component further configured for:
   providing access to the vehicle system to a plurality of end users using one or more interfaces.

7. A method for detecting gas levels in surrounding environments using an integrated gas detection and vehicle telematics system of a vehicle, the method comprising:
   monitoring using a gas detector a level of one or more gases in a surrounding environment;
   determining that a threshold level of the one or more gases has been detected;
   generating an alert signaling detection of the threshold level of the one or more gases, wherein the alert is generated based on the determination that the threshold level of the one or more gases has been detected;
   upon receiving the alert, providing access to an access component in a wireless communications network for communicating the alert; and
   communicating the alert to at least a command center.

8. The method of claim 7, wherein the gas detector having one or more sensors is mounted on one or more external portions of the vehicle.

9. The method of claim 7, wherein generating an alert further comprises:
   generating an audible alarm comprising a visual indication in at least an internal portion of the vehicle.

10. The method of claim 7, wherein generating the alert comprises:
    determining a location of a vehicle using global position system;
    composing the alert, wherein the alert includes at least the level of the one or more gases and the location; and
    providing the alert for communication.

11. The method of claim 10, wherein the alert is a digital message further comprising at least two selected from the following:
    a driver;
    a make/model of the vehicle;
    additional diagnostic information; and
    a time of the alert.

12. The method of claim 7, further comprising receiving one or more communications from the command center.

13. The method of claim 7, wherein the command center further communicates the one or more alerts to one or more recipients.

14. The method of claim 7, wherein communicating the alert is facilitated by a mobile gateway associated with a wireless communications network.

15. The method of claim 14, wherein the wireless communications network further provides remote access to the integrated gas detector and vehicle telematics system to a plurality of end users using one or more interfaces.

16. A method for retrofitting vehicles with integrated gas detection and vehicle telematics systems, the method comprising:
    attaching a gas detector component having one or more sensors on one or more external portions of a vehicle for monitoring a level of one or more gases in a surrounding environment;
    installing a mobile gateway component in the vehicle, wherein upon receiving an alert, the mobile gateway provides communications with an access component in a wireless communications network; and
    configuring a vehicle telematics component with one or more vehicle telematics features in conjunction with the gas detector component and mobile gateway component for determining that a threshold level of the one or more gases has been detected and generating the alert.

17. The method of claim 16, wherein the one or more external portions includes at least a front portion of the vehicle.

18. The method of claim 16, wherein the mobile gateway component further comprises a global positioning system.

19. The method of claim 16, further comprising installing a wireless signal booster coupled to an antenna.

20. The method of claim 16, wherein the vehicle telematics component is configured for facilitating the communication of one or more alerts upon the gas detector component measuring a threshold level of one or more gases.

* * * * *